United States Patent
Webb, III et al.

(10) Patent No.: US 9,130,687 B2
(45) Date of Patent: Sep. 8, 2015

(54) SYSTEM AND METHOD FOR DIRECT PASSIVE MONITORING OF PACKET DELAY VARIATION AND TIME ERROR IN NETWORK PACKET COMMUNICATIONS

(71) Applicant: Anue Systems, Inc., Austin, TX (US)

(72) Inventors: Charles A. Webb, III, Austin, TX (US); Kishan Shenoi, Saratoga, CA (US)

(73) Assignee: Anue Systems, Inc., Austin, TX (US)

( * ) Notice: Subject to any disclaimer, the term of this patent is extended or adjusted under 35 U.S.C. 154(b) by 117 days.

(21) Appl. No.: 13/792,342

(22) Filed: Mar. 11, 2013

(65) Prior Publication Data

US 2013/0315265 A1    Nov. 28, 2013

Related U.S. Application Data

(60) Provisional application No. 61/650,558, filed on May 23, 2012.

(51) Int. Cl.
| | |
|---|---|
| *H04J 3/06* | (2006.01) |
| *H04J 3/14* | (2006.01) |
| *H04L 12/26* | (2006.01) |
| *H04L 7/00* | (2006.01) |

(52) U.S. Cl.
CPC .............. *H04J 3/0635* (2013.01); *H04J 3/14* (2013.01); *H04L 43/087* (2013.01); *H04J 3/0667* (2013.01); *H04J 3/0673* (2013.01); *H04L 7/0012* (2013.01); *H04L 43/106* (2013.01)

(58) Field of Classification Search
CPC ...... H01J 3/0635–3/0697; H04L 7/00–7/0012; H04L 2012/5674; H04L 1/205; H04W 84/20; H04W 56/015; H04W 92/10
USPC ................... 370/503, 516, 519, 252
See application file for complete search history.

(56) References Cited

U.S. PATENT DOCUMENTS

| | | |
|---|---|---|
| 5,521,907 A | 5/1996 | Ennis et al. |
| 5,805,602 A | 9/1998 | Cloutier et al. |
| 6,542,754 B1 | 4/2003 | Sayers et al. |
| 6,628,642 B1 | 9/2003 | Mile'n et al. |
| 6,728,209 B2 | 4/2004 | Pate et al. |
| 7,292,537 B2 | 11/2007 | Charcranoon |
| 7,716,375 B2 | 5/2010 | Blum et al. |

(Continued)

OTHER PUBLICATIONS

Hirschmann, White Paper, "Precision Clock Synchronization", The Standard IEEE 1588, Jul. 2009, 20 pgs.

(Continued)

*Primary Examiner* — Warner Wong
(74) *Attorney, Agent, or Firm* — Egan, Peterman & Enders LLP.

(57) ABSTRACT

Systems and methods are disclosed for direct passive monitoring of packet delay variation and time error in network packet communications. Packets traversing between slave and master clocks are monitored to provide direct results of the actual conditions without the need to rely upon inference determinations. Certain embodiments provide tap configurations to monitor packet flows, while certain other embodiments provide in-line configurations to monitor packet flows. Certain further embodiments provide multiple monitoring devices that can be used for passive monitoring purposes, such as passive monitoring to test boundary clock. These multiple monitoring devices can be configured to be within a single or different test instruments. Other variations are also described.

20 Claims, 15 Drawing Sheets

(56) References Cited

U.S. PATENT DOCUMENTS

| | | |
|---|---|---|
| 7,787,576 B2 | 8/2010 | Foerster et al. |
| 7,821,958 B2 | 10/2010 | Smith et al. |
| 7,990,880 B2 | 8/2011 | Emori |
| 8,243,599 B2 | 8/2012 | Becker et al. |
| 8,300,749 B2 | 10/2012 | Hadzic et al. |
| 8,345,570 B2 | 1/2013 | Wong et al. |
| 8,427,966 B2 | 4/2013 | Ilnicki |
| 8,532,148 B2 | 9/2013 | Homma et al. |
| 8,593,975 B2 | 11/2013 | El-Hennawey et al. |
| 2006/0077902 A1 | 4/2006 | Kannan et al. |
| 2009/0276542 A1* | 11/2009 | Aweya et al. .......... 709/248 |
| 2011/0075685 A1 | 3/2011 | Xu et al. |
| 2011/0222515 A1 | 9/2011 | Wang |
| 2012/0213234 A1 | 8/2012 | Zhang et al. |
| 2012/0275317 A1 | 11/2012 | Geva et al. |
| 2013/0163618 A1 | 6/2013 | Sergeev et al. |

OTHER PUBLICATIONS

Webb III et al., "System and Method for Monitoring Network Synchronization," U.S. Appl. No. 14/022,466, filed Sep. 10, 2013, 32 pgs.

* cited by examiner

SYSTEM AND METHOD FOR DIRECT PASSIVE MONITORING OF PACKET DELAY VARIATION AND TIME ERROR IN NETWORK PACKET COMMUNICATIONS

RELATED APPLICATIONS

This application claims priority to the following provisional application: U.S. Provisional Patent Application Ser. No. 61/650,558, filed May 23, 2012, and entitled "SYSTEM AND METHOD FOR DIRECT PASSIVE MONITORING OF PACKET DELAY VARIATION IN NETWORK PACKET COMMUNICATIONS," which is hereby incorporated by reference in its entirety.

TECHNICAL FIELD OF THE INVENTION

This invention relates to the use of timing protocols in network packet communications and, more particularly, to monitoring packet delays associated with network packet communications.

BACKGROUND

Packet-based timing methods are becoming essential for delivering timing over packet-switched networks, often referred to as the cloud. In particular, Precision Timing Protocol (PTP) (i.e., IEEE 1588v2) is becoming popular for delivering timing information (time/phase/frequency) from a Grand Master (GM) clock to slave clocks in end application-specific equipment. For example, wireless base stations providing mobile telephony services require precise timing, and the backhaul method of choice is Ethernet.

The Grand Master clock provides timing information over the packet-switched network to the slave clocks by exchanging packets with embedded time-stamps related to the time-of-arrival and time-of-departure of the timing packets. The slave clock utilizes this information to align its time (and frequency) with the Grand Master. The Grand Master is provided an external reference to serve as the basis for time and frequency. Most commonly, this reference is derived from the GPS System that in turn is controlled by the US Department of Defense, and its timing is controlled very precisely and linked to the US Naval Observatory.

The quality of timing transfer is greatly affected by packet delay variation (PDV). PDV is the phenomenon whereby different packets take different times to traverse the network between the communicating clocks. PDV is influenced primarily by traffic loading. The higher is the traffic load in the network; the greater is the extent of packet delay variation. Conversely, monitoring the quality of timing transfer between two points in a network provides visibility into the traffic loading in the network segment between these two points.

Prior methods for monitoring employ a slave-like clock device that communicates with the master over all or part of the same network over which the actual slave communicates with the master. The slave-like clock device has its own reference and does not actually discipline its local clock according to the timing messages between the device and the master but just retains the time-stamps and thereby estimates the PDV behavior. This behavior is then inferred as the network condition that the actual slave will experience when actually deployed.

As described above, one of the more important requirements of a digital communication network is to support real-time communications applications which, typically, require time or frequency alignment, or a combination of both. For example, time alignment is used by real-time instrumentation systems gathering data at specific time intervals or by machinery operating according to specific timing. Frequency alignment is required in time-division-multiplexed (TDM) systems and in multi-media streaming systems, which require fixed, reproducible, video or audio sample rates across multiple clients. One of the most popular uses of packet-based timing in modern telecommunications networks is to support mobile telephony deployments.

FIG. 1 (Prior Art) is a conceptual diagram that illustrates a mobile telephony deployment in terms of the timing and synchronization aspect of the packet network 100. At each cellular base station, also referred to as a Node-B and in the case of packet-network interconnect as an eNode-B, there is a slave clock 120 (also 121) that must be synchronized with all the other clocks in base stations that collectively comprise the cellular access network. The clocks are synchronized by aligning each one to a grand master clock 105. The grand master clock 105 typically develops its timing reference from a Global Navigation Satellite System (GNSS), such as GPS (Global Positioning Systems), using a GPS receiver (with GPS antenna) 140. In the example shown, the clocks and their interactions, as well as the terminology used, are governed by the PTP (Precision Timing Protocol), also referred to as IEEE 1588 which is the designation of the standard. In the example considered, the GNSS of choice is the GPS system. The timing information is carried using packets, and there is a packet flow 150 between the grandmaster clock 105 and each of the slave clocks 120/121 that are in the alignment set. In normal operation, because the slave clocks 120/121 are all synchronized directly or indirectly to a common reference, the GNSS, they are all mutually aligned in time and frequency. For specificity and simplicity of explanation, it is assumed that the network does not provide on-path support in the form of transparent clocks or boundary clocks; however, the extension of the concepts described herein are easily extended to the case where the network provides on-path support or partial on-path support. With this assumption, it suffices to refer to the grand master 105 in FIG. 1 (Prior Art) as simply "master."

The manner in which the slave clocks 120/121 align themselves with the master 105 is explained using FIG. 2 (Prior Art). Packet exchanges between master and slave provide measurements of the transit delay between the two. The particular protocol employed determines the method whereby the measurements ("time-stamps") are communicated between the two entities. This protocol can be, for example, PTP or NTP (Network Time Protocol). Both are supported by packet networks in a transparent fashion. For specificity, the examples described assume PTP.

Referring to FIG. 2 (Prior Art), the sequence of events and important items of information associated with an exchange of packets between master 210 and slave 220 are:

Event A 230: Packet (in PTP this is the Sync_message) is transmitted by master 210 and the time-of-departure 251 is $t_1$.

Event B 232: The packet (Sync_message) arrives at slave 220 that measures the time-of-arrival as $\tau_2$; assuming that the slave time offset from master (ofm) is $\epsilon$, the actual time-of-arrival 252 is $t_2 = \tau_2 + \epsilon$.

Event C 234: Packet (e.g., the PTP message referred to as Delay_request) is transmitted by slave 220 that notes the time-of-departure is $\tau_3$; assuming that the slave time offset from master is $\epsilon$, the actual time-of-departure 253 is $t_3 = \tau_3 + \epsilon$.

Event D 236: The packet (Delay_request) arrives at master 210 that measures time-of-arrival 254 as $t_4$.

Event E 237: Packet (the Delay_response message) is sent from the master 210 towards the slave 220, and the content of the packet contains the time-of-arrival $t_4$ 254 (of the Delay_request at the master).

Event F 238: The packet (Delay_response) arrives at the slave 220. Now the slave clock has all four of the relevant time-of-arrival and time-of-departure values associated with this exchange of packets.

Such a two-way exchange of packets can provide information suitable for allowing the slave 220 to align in time with the master 210 (assuming that both sides have knowledge of the time stamps). If the exchange of information is only one-way from master 210 to slave 220 (referred to as the forward direction), the slave 220 can still align its clock (frequency) with the master (syntonization) because the packet contains the time-of-departure 251 from the master ($t_1$) and because the slave 220 measures the time-of-arrival ($\tau_2$). One-way methods, where the time-stamped packets flow from slave 220 to master 210, can be employed provided a mechanism is available for the slave 220 to obtain the results of the master measuring time-of-arrival at the master ($t_4$).

There are four measured values that can be communicated between the master and slave, namely, ($t_1, \tau_2, \tau_3, t_4$). It is noted that such a two-way exchange involves one packet (message) in each direction, and they do not necessarily have to be consecutive as long as the time-stamp information is communicated appropriately. In some instances, the rate at which packets are transmitted in the two directions can be different. Denoting by $\Delta_{MS}$ 240 and $\Delta_{SM}$ 244 the transit delays between the master and slave and vice versa, the following equations can be established:

$$t_4 = \tau_3 + \epsilon + \Delta_{SM} \text{ (from an S-to-M packet)}$$

$$t_1 = \tau_2 + \epsilon - \Delta_{MS} \text{ (from a M-to-S packet)} \quad \text{(Eq. 1)}$$

In an actual time-transfer situation, there are two equations with three unknowns. As such, it is common to assume reciprocity of transit delay between the two devices, thereby reducing the number of unknowns to two and therefore computing e, the slave time offset from master from (Eq. 2).

$$\varepsilon = \frac{(t_4 + t_1) - (\tau_3 + \tau_2)}{2} = \frac{(t_4 - \tau_3) - (\tau_2 - t_1)}{2} \quad \text{(Eq. 2)}$$

Because of the fundamental statistical behavior of packet networks, the transit delays are not fixed and can vary from packet to packet. To counter this packet delay variation, as well as to account for any drift in the slave clock oscillator, the estimates of clock offset are made routinely, and it is well known that the mitigation of the deleterious effects of packet delay variation and oscillator drift is improved by using more frequent exchanges of timing packets. Ordinary slave clocks 120 (also 121) develop their estimate of time offset from master based on (Eq. 2).

SUMMARY OF THE INVENTION

Systems and methods are disclosed for direct passive monitoring of packet delay variations and time error in network packet communications. The embodiments disclosed herein monitor the actual packets traversing between slave and master clocks and thereby provide direct results of the actual conditions and do not rely on inference determinations as with prior systems.

As described herein, passive monitor devices can observe and analyze the packet timing signal traversing between communicating clocks. Based on measurements of time-of-arrival and time-of-departure of packets at the devices and from the time-stamps provided in the packets, the passive monitor device can analyze the network conditions between the monitor and the master. Further, by deploying two passive monitor devices, the sub-network between the monitors can be analyzed and characterized. In addition, by incorporating both passive monitor functions in a single device, testing of boundary clocks is greatly improved. Furthermore, the advantages described herein for testing boundary clocks also apply to testing any other packet timing device having two or more ports (for example, PTP transparent clocks).

Advantageous features of the disclosed embodiments include, but are not limited to, the following advantages. A passive monitor device can be placed in-line with an actual session between master and slave clocks and is configured to introduce a fixed, symmetric, delay. A passive monitor device can bridge an actual session between master and slave, which is in contrast to prior systems that use additional switches and mirroring ports that tend to add impairments to the timing signal between master and slave. A passive monitor device can quantify timing impairments between the device and the master. Using two monitor devices, the timing impairment introduced by a sub-network can be quantified. Placing both "sides" of impairment measurements in the same equipment eliminates a source of measurement error, namely any synchronization error between devices (e.g., if separate). Further, the sub-network could be a boundary clock, in which case having the capability of measuring both "sides" of a network interface is particularly advantageous.

Prior systems use slave clocks in a monitor mode to quantify the performance of the network between monitor point and the master. This approach assumes that the behavior of the network can be inferred/estimated.

In contrast, the passive monitor embodiments described herein can measure the performance of the network in a "live session" using the actual timing packets flowing between master and slave. Because the monitor analyzes the actual packets flowing between master and slave, the monitor has significant advantages. For example, the monitor can analyze the content and timings of the "live session" packets, measure the actual packet rates in use, observe protocol negotiations and handshakes, and analyze protocol mappings. Furthermore, with two or more monitors, it is possible to monitor the same timing flow at multiple points within a network, and this makes it possible to directly measure the impairment introduced by the portion of the network between the two or more monitors.

Other features and variations can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Systems and methods are disclosed for direct passive monitoring of packet delay variations and time error in network packet communications.

As described in more detail below, the embodiments disclosed herein monitor the actual packets traversing between slave and master clocks and thereby provide direct results of the actual conditions and do not rely on inference determinations as with prior systems. Certain embodiments described herein provide a bridged configuration or an in-line configuration with fixed, symmetric, delay, providing significant advantages over prior systems. Prior systems often utilize a switch arrangement with a "mirror" port to monitor the packets traversing between the master and slave. The packet delay variation (PDV) introduced by these switch arrangements are additive to, and indistinguishable in nature from, the network PDV between master and slave. Further, testing the behavior of boundary clocks typically requires monitoring traffic on both sides of the unit under test (UUT), the "slave" side as well as the "master" side. Certain embodiments described herein provide a monitoring environment in a single test instrument. This single test instrument has the advantage over multiple test devices because any error in the synchronization of the test devices is not distinguishable from an impairment being introduced by the unit under test (UUT). Various features and variations can be implemented, if desired, and related systems and methods can be utilized, as well.

Example embodiments that provide direct passive monitoring of packet delay variations and time error in network packet communications are now described in more detail with respect to FIGS. 3, 4, 5, 6A-D, 7, 8A-B, 9A-B, and 10A-B.

Figure 3:
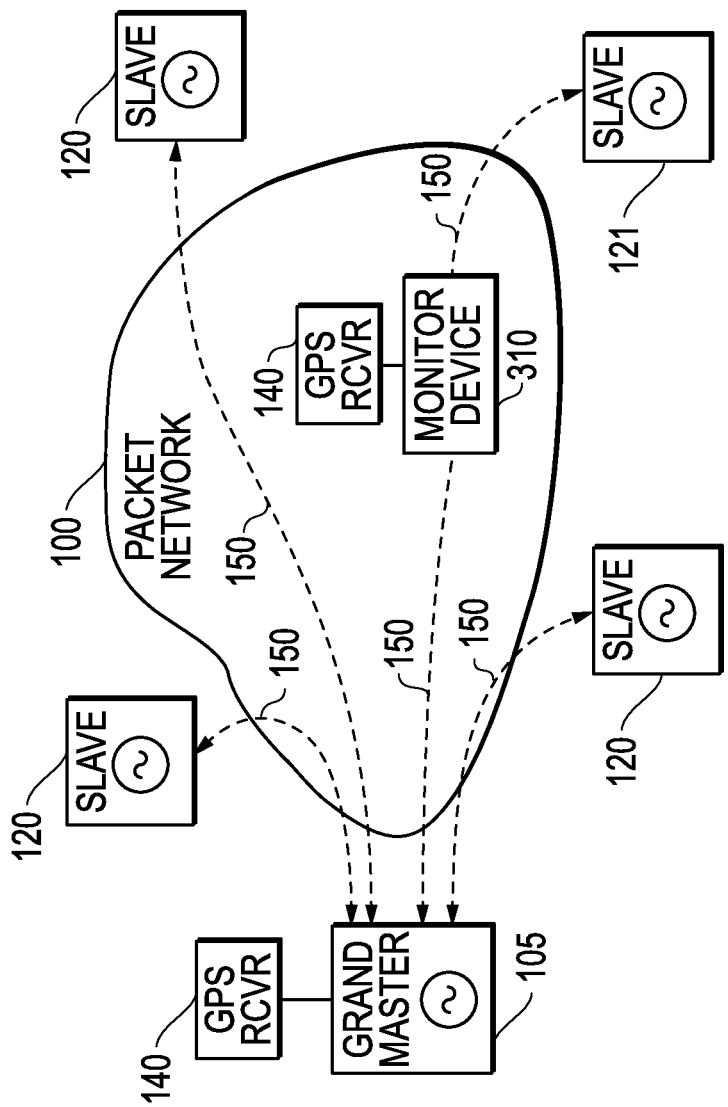
FIG. 3 is a block diagram of an embodiment including a monitor device configured to intercept and relay packets while directly determining timing information.

As shown in FIG. 3, special monitoring devices 310 can be used to intercept and relay messages between the master 105 and the slave 121. Just for convenience, such a slave is denoted as 121. Provided that the monitoring device 310 introduces a fixed, constant, symmetric delay for the timing packets between master 105 and slave 121, it does not introduce any degradation or impairment to the time/timing transfer between the master 105 and slave 121. It is preferable that the monitoring device 310 have a time reference 140 that is equivalent to the grand master (e.g., GPS) timing reference 140 and therefore can consider its clock to be aligned with the grand master. That is, they can be viewed as measurement instruments that are protocol-aware but do not necessarily use the timing information in the packet flow to discipline their local clock. The timing information in the packet flow can, however, be used in conjunction with the local GNSS reference to measure the packet delay variation between the monitoring device 310 and the master clock 105.

Figure 1:
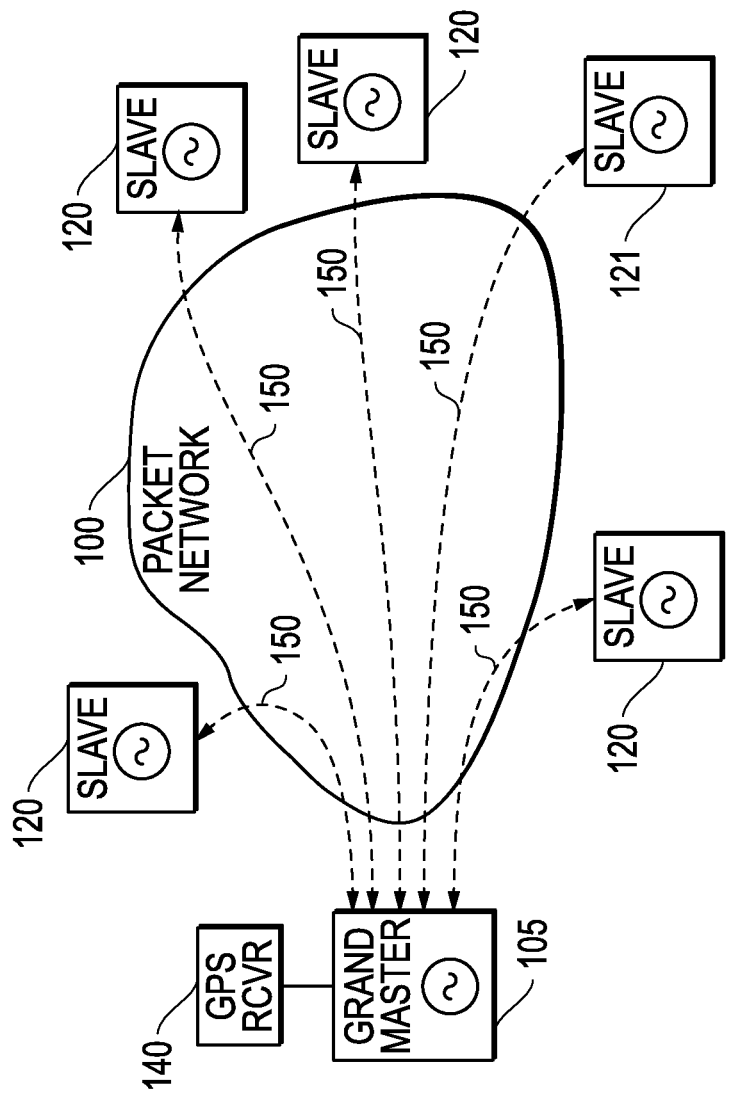
FIG. 1 (Prior Art) is a block diagram of an embodiment that illustrates a mobile telephony deployment in terms of the timing and synchronization aspect of a packet network.
Figure 2:
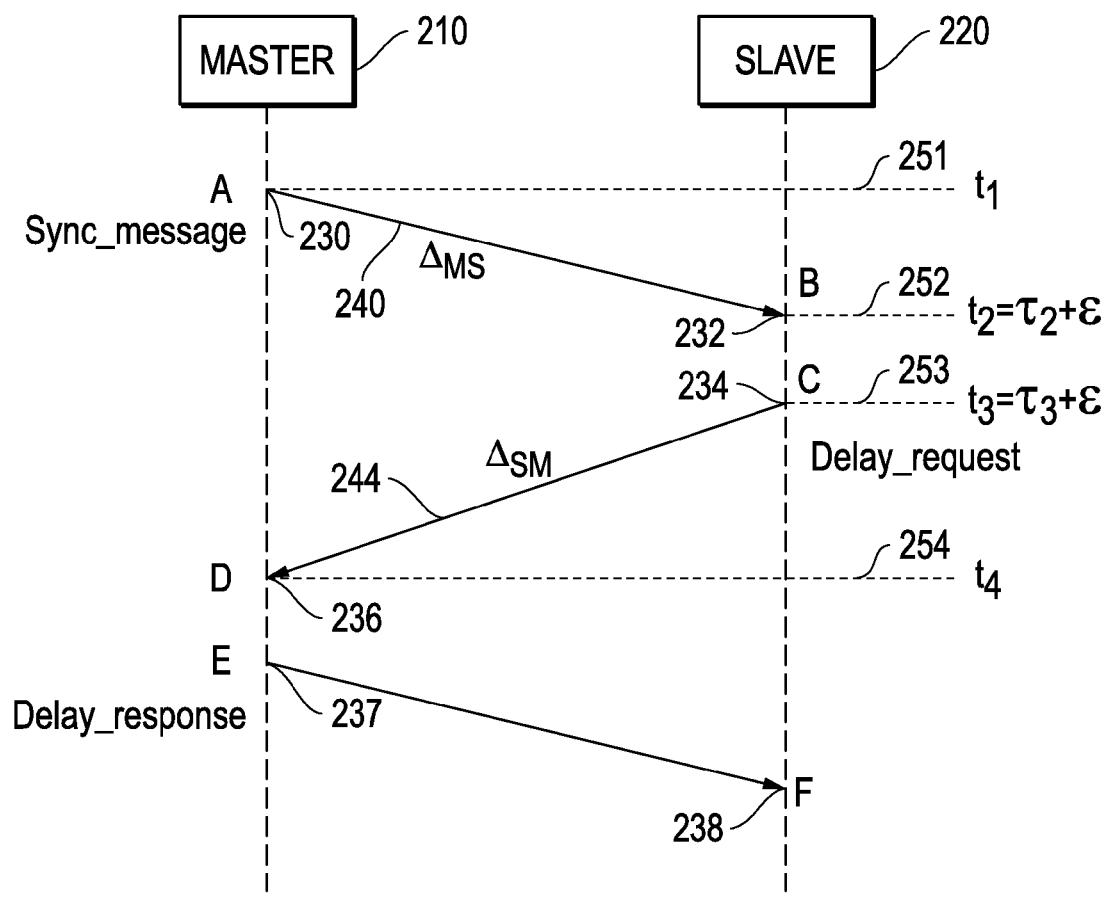
FIG. 2 (Prior Art) is a timing diagram for packet exchanges between a master and a slave.
Figure 4:
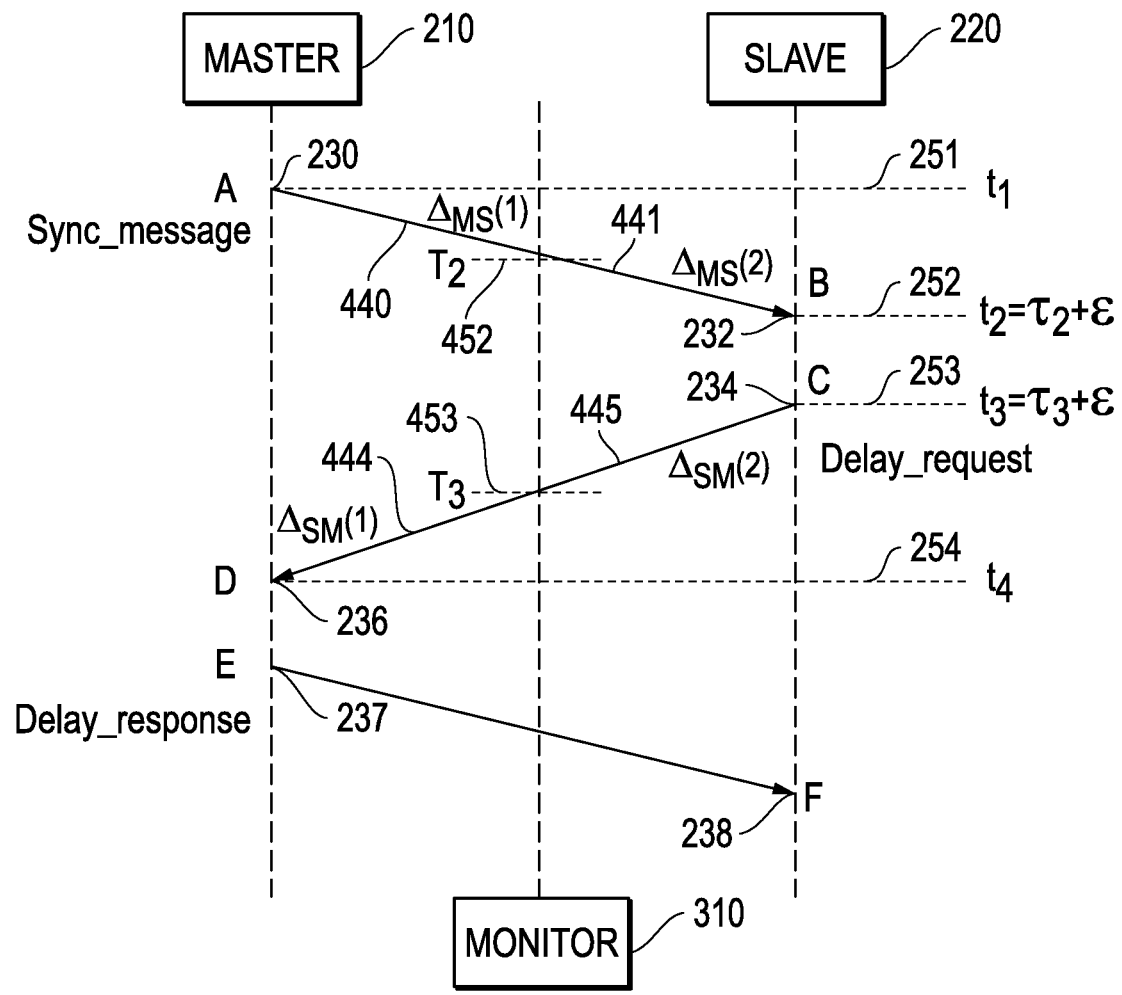
FIG. 4 is a timing diagram of an embodiment for packets exchanges between a master and a slave including a monitor device.

As shown in FIG. 4, the monitoring device 310 time-stamps the sync_message traveling from master 105 to slave 121 as it traverses the device 310, and from inspecting the packet, it can read $t_1$ 251. This time-stamp is denoted by $T_2$ 452 in FIG. 4 which is a simple extension of FIG. 2 (Prior Art) and serves to emphasize that the monitoring device 310 has visibility of all packets going between master 210 and slave 220. Similarly, the device 310 time-stamps the delay_request message going from the slave 220 to the master 210 as it traverses the device 310, and this time-stamp is denoted by $T_3$ 453. The monitoring device 310 examines the delay_response packet to obtain $t_4$ 254.

In such devices, the following equations provide estimates of the one-way delay between grand master 105 and monitoring device 310:

$$\Delta_{SM}(1) = t_4 - T_3 \text{ (from an } S\text{-to-}M \text{ packet)}$$

$$\Delta_{MS}(1) = T_2 - t_1 \text{ (from a } M\text{-to-}S \text{ packet)} \qquad \text{(Eq. 3)}$$

The "(1)" notation for delays 440 and 444 is used to indicate that the delays are between the master 105 and the monitor device 310. The notation "(2)" used for delays 441 and 445 indicates that these delays are between the monitor device 310 and the slave 220. Estimates can be developed for each packet that is involved in the exchange between the communicating clocks. For the $n^{th}$ packet travelling between master 210 and slave 220, the "forward delay" sequence $\{x_F(n)\}$ can be evaluated as $$x_F(n) = T_2(n) - t_1(n) \qquad \text{(Eq. 4)}$$

and for the $n^{th}$ packet traversing the network from slave 220 to master 210, the "reverse delay" sequence can be evaluated as $$x_R(n) = t_4(n) - T_3(n) \qquad \text{(Eq. 5)}$$

In Eq. 4 and 5, the time interval between packets is not shown explicitly. Generally speaking, it is assumed that the packet rate is nominally uniform and that the time interval between packets is nominally $\tau_0$. However, it is noted that the concepts described herein apply equally well to non-uniform packet rates.

Figure 7:
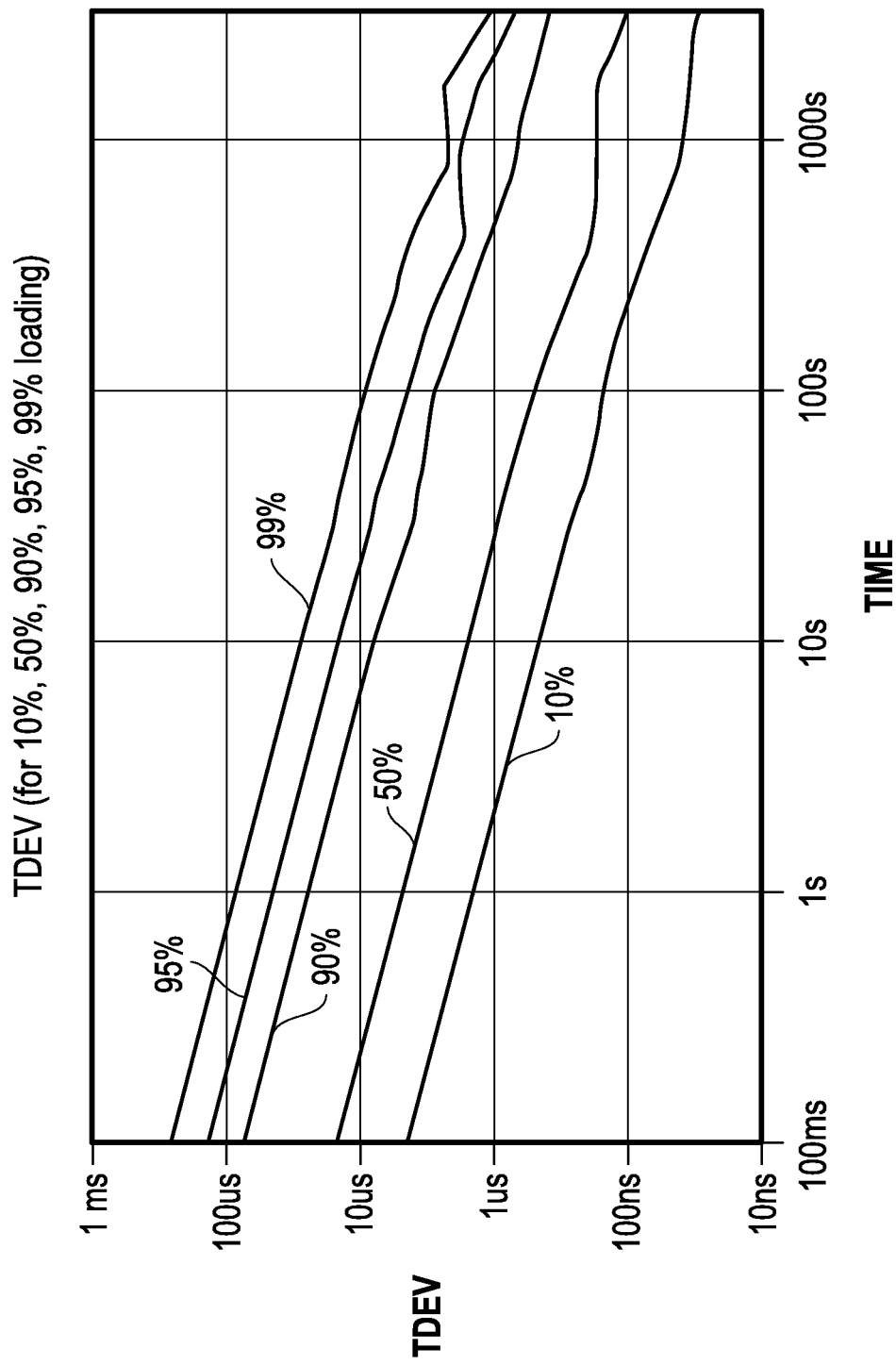
FIG. 7 is a representative diagram of time deviation (TDEV) within a network.

The sequence $\{x_F(n)\}$ and the sequence $\{x_R(n)\}$ can be treated as "time error sequences" and several known analytical metrics can be computed. Of special interest is the TDEV (time deviation) metric. TDEV is a function of the observation interval ($\tau$) and is known to be a good indicator of loading. That is, an increase in measured TDEV is associated with an increase in network congestion. This is illustrated by the following contrived example. A simulation of 8 GigE switches with loading of 10%, 50%, 90%, 95% and 99% was performed assuming a nominal packet rate of 10 Hz ($\tau_0 = 100$ ms). The competing traffic was modeled according to Model 1 of G.8261. The TDEV curves are shown in FIG. 7. Of specific importance here is to note that with increasing load the general TDEV increases at all observation intervals, and it is clear that the TDEV metric provides an indication of network loading.

Another metric that identifies loading is the probability density function (pdf). In practice, a histogram is computed that is related to the pdf. Specifically, the minimum value of observed time error is computed, say $x_{MIN}$. The percentage of packets that have a time-error value between $x_{MIN}$ and ($x_{MIN}$+

Figure 8A:
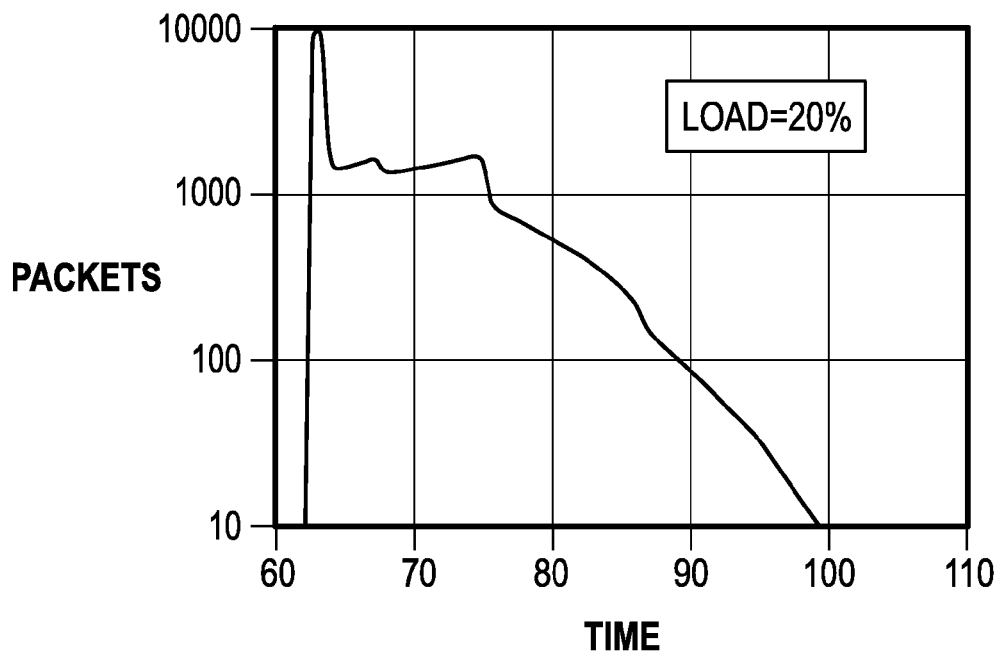
FIGS. 8A and 8B are representative diagrams of probability density functions (pdf) within a network.
Figure 8B:
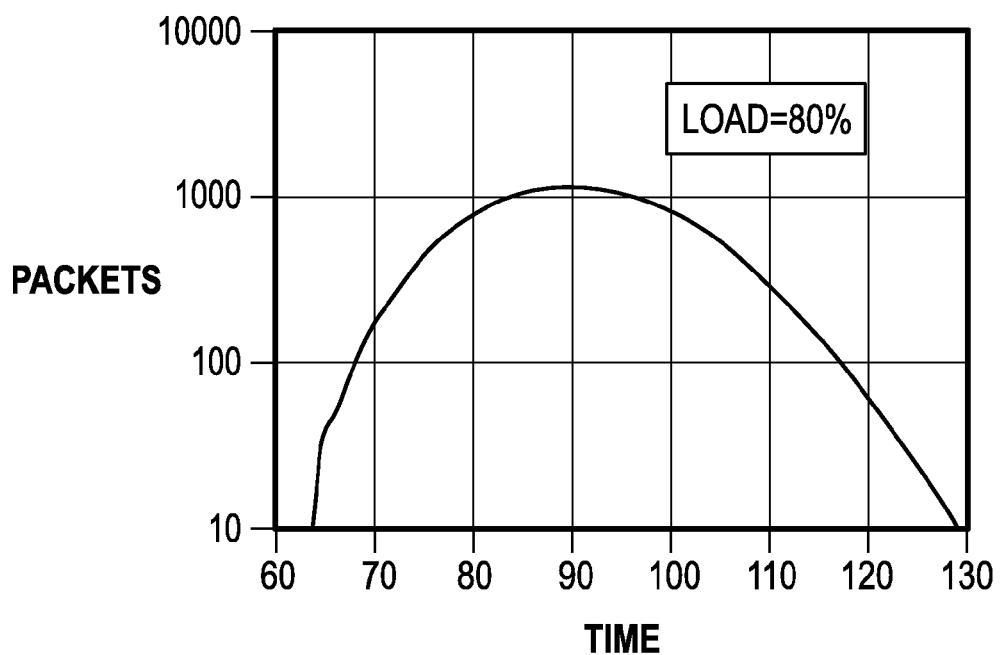

Δ) is computed, say η. The particular choice of Δ is application specific but will generally be of the order of 100 microseconds. The parameter η is inversely proportional to the loading and can be used to identify changes in loading pattern. An example of the behavior of the pdf with respect to loading is depicted in FIGS. 8A-B. Two cases are shown wherein the loading is 20% (FIG. 8A) and 80% (FIG. 8B). The dependence on the loading of the shape of the pdf is clearly evident. Two metrics of special importance for analyzing the pdf are:
 (a) Standard deviation σ—A larger value of standard deviation (equivalently variance) indicates the pdf is "broad", corresponding to higher loading.
 (b) Cumulative distribution function $cdf(x_{MIN}+\Delta)$—The value $cdf(x_{MIN}+\Delta)$ quantifies the percentage of packets that have a delay of less than Δ more than the minimum $(x_{MIN})$.

Figure 5:
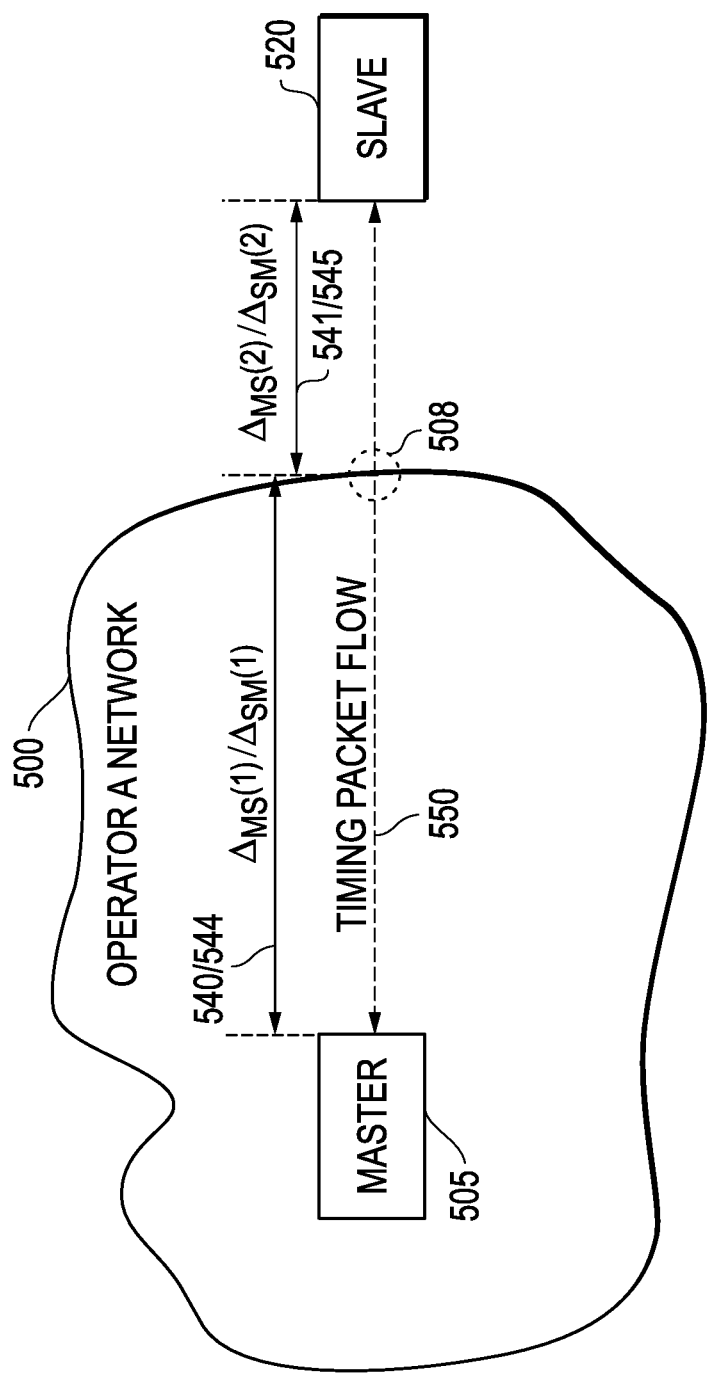
FIG. 5 is a block diagram of an embodiment for an application utilizing a monitor device.
Figure 6A:
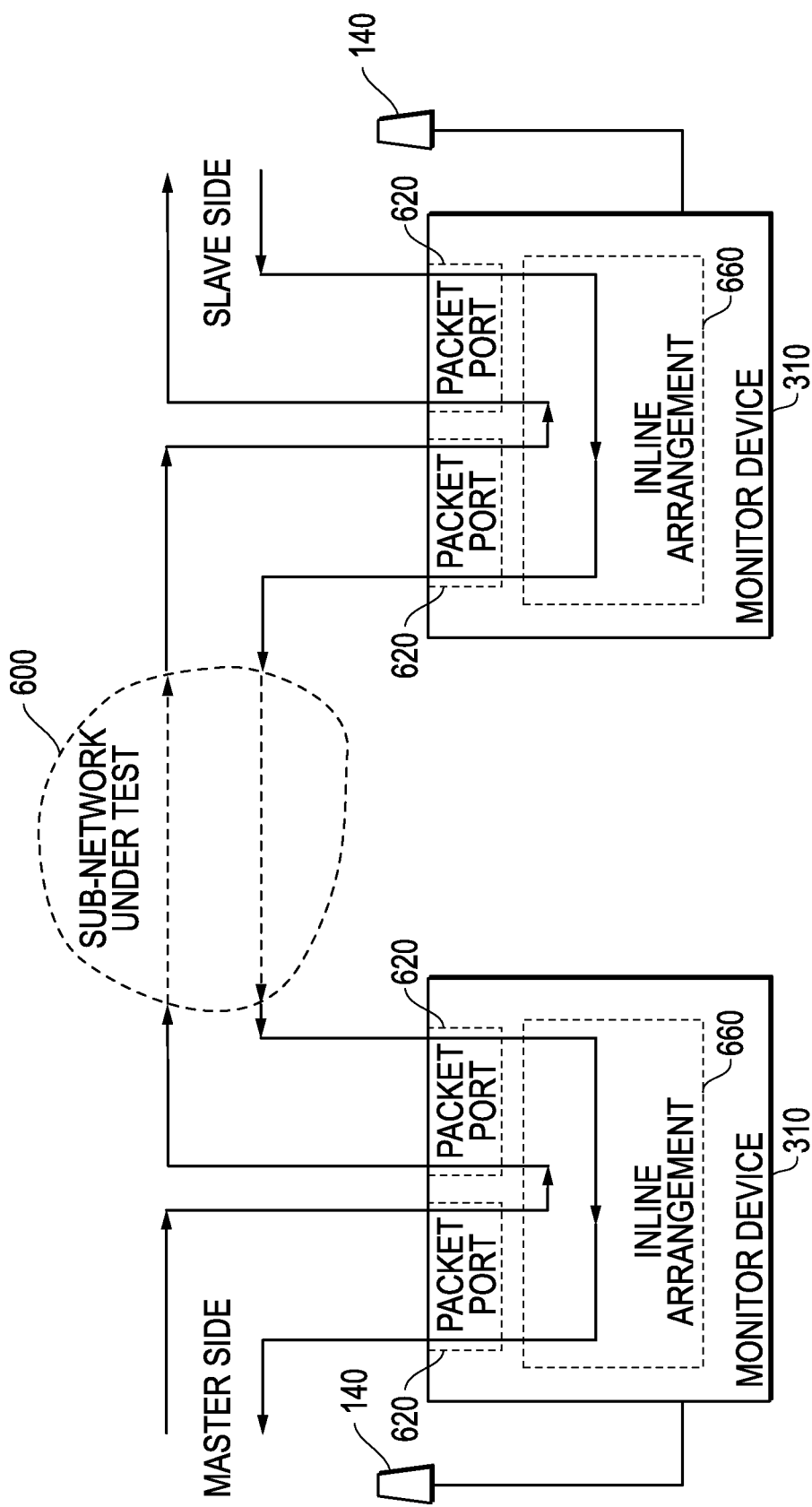
FIGS. 6A and 6C are block diagrams of embodiments that utilize an inline arrangement for a monitor device.
Figure 6B:
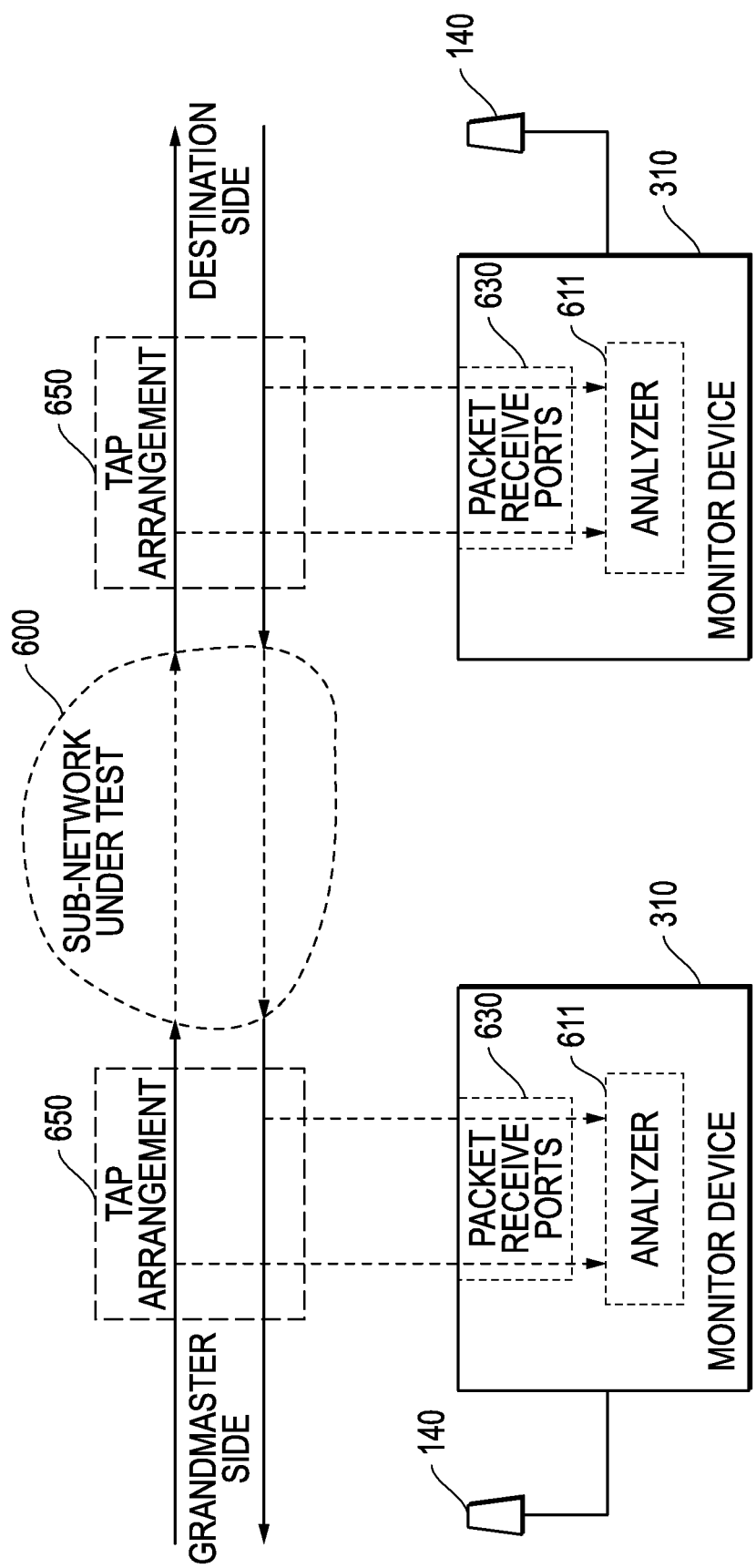
FIGS. 6B and 6D are block diagrams of embodiments that utilize a tap arrangement for a monitor device.
Figure 6C:
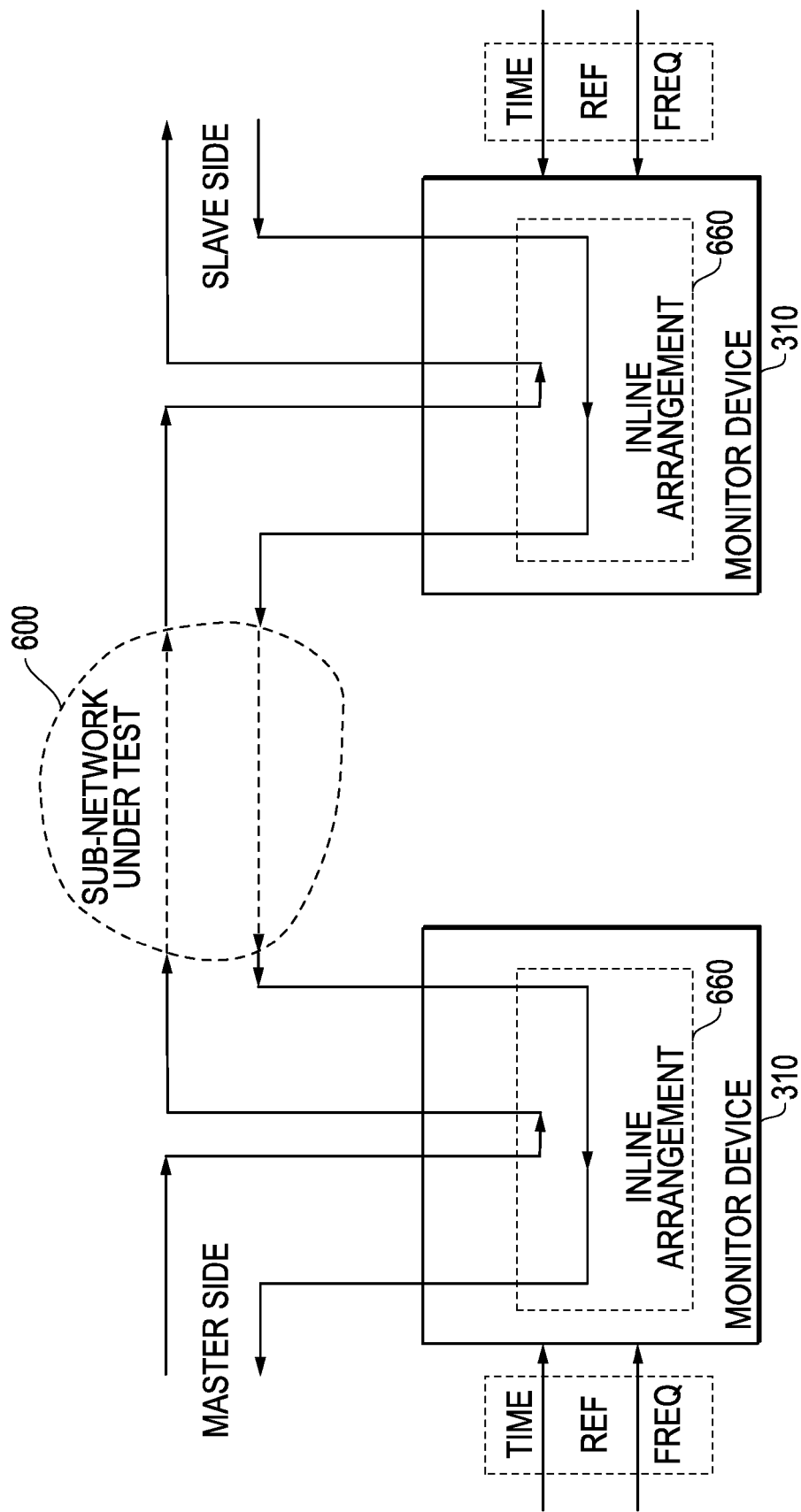
Figure 6D:
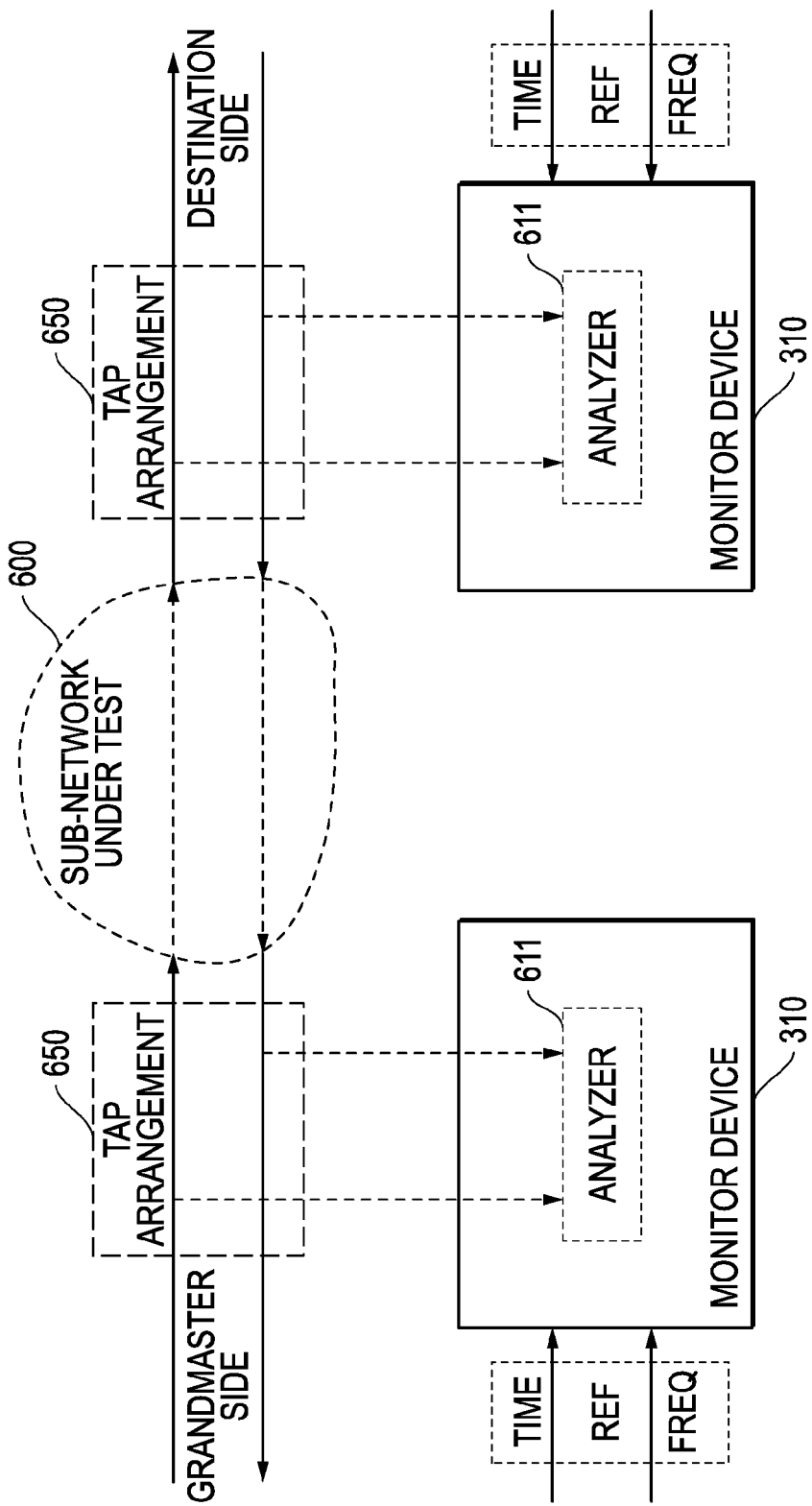

One application of such a monitor device is depicted in FIG. 5. An operator A maintains a network 500 and provides, for example, timing services from a master clock 505 to a client slave clock 520 that is not within Operator A network 500. Operator A is responsible for a service level agreement (SLA) but that extends only to the interface between the operator A network 500 and the other network that provides the remaining connectivity to the slave 520. That is, the network interface 508 is a demarcation point. Operator A can deploy a monitor device at this interface point to verify that the transit delays $\Delta_{SM}(1)$ 544 and $\Delta_{MS}(1)$ 540, and associated transit delay variation for the timing packet flow 550, are within the bounds of the SLA. The transit delays $\Delta_{SM}(2)$ 545 and $\Delta_{MS}(2)$ 541 are between the network interface 508 and the slave device 520 within the other network.

Suitable structures for a monitor device 310 are shown in FIGS. 6A-D. In particular, there are two architectures depicted therein for monitoring/analyzing the traffic. In one case, referred to as an "in-line configuration" (see FIGS. 6A, 6C), the traffic is physically passed through the monitor device 310. The device 310 adds a fixed, constant delay that is equal in both directions and therefore does not impact the timing transfer characteristics of the packet timing signal. The traffic from each direction is wired through packet ports 620 and passed through in-line configurations 660 with the fixed delay. As the packets traverse the device the time-stamps for time-of-arrival and time of departure are struck. In the second case (see FIGS. 6B, 6D), referred to as a "tap arrangement," the transmission medium carrying the packets is bridged using, effectively, receive only ports 630, as shown, from tap arrangements 650. The packets are monitored by monitor device 310 and analyzed using analyzer 611 but the transmission delay of the packets between the master and the slave is not modified by the device 310 and therefore does not change the timing transfer characteristics of the packet timing signal.

Prior methods utilized a switch and a mirroring port to effectively tap the communication between the master and the slave. This prior method introduced additional PDV between master and slave, thereby introducing an impairment into the timing signal between master and slave clocks. The monitor device 310 in FIGS. 6A/C introduces a fixed, symmetric, delay, thereby not introducing any timing impairments. The monitor device 310 in FIGS. 6B/D clearly introduces no impairment to the timing signal between master and slave clocks.

For accurate results, it is necessary that the monitoring devices have the same time/frequency reference. This can be achieved using a GPS receiver. In other cases, there may be other reference sources that provide time/frequency references to the devices, and these references are traceable to a common source, often GPS. For accurate results, it is necessary that the monitor devices have the same or equivalent timing reference(s) that provides at least frequency (syntonization) and preferably time and frequency (synchronization).

Prior methods used a modified slave clock to monitor the network. That is, a slave clock that is enhanced with a timing reference, essentially traceable to the same source as the timing reference used by the master, is deployed as a slave at the place in the network where the actual slave will be deployed. By measuring the transit delays and thereby the PDV metrics, this prior method infers the impact of the network on the actual slave. However, because this prior method introduces packets in the network, it can add impairments. Also, this prior method does not monitor the actual packets being utilized by the slave clock and therefore can only estimate the network impact on the slave clock. In contrast, the monitoring devices described herein examine the actual packets used, and the need for inference and/or estimation is removed.

One particular application involves monitoring the performance of a sub-network 600 through which a PTP session between master and slave is being conducted. Two monitor devices are used as depicted in FIGS. 6A-D. Implicit in the arrangement is that the monitor devices 310 communicate results between each other and/or between them and a master station that manages the operation of a multiplicity of monitor devices and provides the results to the network operator via an appropriate operational support system (OSS) or network management system (NMS).

Another particular application of the methods described herein is for the testing of boundary clocks. It is well known that a boundary clock has a slave aspect, whereby timing is transferred to the boundary clock from an upstream master, and a master aspect whereby timing is transferred from the boundary clock to a downstream slave. The arrangement in FIGS. 9A and 9B can be used to test the boundary clock unit under test (UUT) 900 by monitoring the transmissions on both the slave side and the master side of the boundary clock. By combining the two units into a single piece of test equipment 910, any synchronization error between disparate units 310 is rendered moot. Whereas disparate units 310 may indeed be locked to an equivalent reference, any synchronization error will be indistinguishable from the impairment introduced by the boundary clock. By eliminating this error source, the test equipment does a more faithful assessment of the boundary clock performance The principle of testing the boundary clock is explained next in the context of PTP. The terminology of $T_1, T_2, T_3, T_4$ for time-stamps is that commonly used in PTP.

The test equipment (MON) monitors the transmission of sync_messages from the master to the slave side of the BC (boundary clock) under test. The time-of-departure of the $n^{th}$ packet from the master, denoted by $T_1^{(M)}(n)$ (the superscript (M) identifies the time-stamp as being struck in the master clock upstream from the BC under test) is available to the BC as well as the test equipment. The Monitor strikes time-stamp $T_2^{(MON)}(n)$ as this $n^{th}$ packet traverses the device towards the slave of the BC. It is noted that the slave of the BC also strikes a time-of-arrival time stamp $T_2^{(BC)}(n)$, but this is not observable by the Monitor.

For simplicity, it is assumed that the delay_request/response mechanism is employed between the BC and its upstream master. The same principles apply for the peer_delay_request/response mechanism.

The test equipment monitors the transmission of delay_request packets from the slave side of the BC under test to the upstream master. The Monitor strikes time-stamp $T_3^{(MON)}(n)$ as this $n^{th}$ packet traverses the device towards the master from the slave of the BC. It is noted that the slave also strikes a time-of-departure time stamp $T_3^{(BC)}(n)$, but this, in general, is not observable by the Monitor. The test equipment monitors the transmission of the delay_response from the master and thereby ascertains the time-of-arrival of the $n^{th}$ delay_request message at the master, namely $T_4^{(M)}(n)$.

Both the BC and the monitor device establish their offset from master (ofm) using the conventional equations. In practice, time-stamps are taken in pairs. Specifically, the time-offset-from-master as computed by the Slave is given by:

$$ofm(n) = \frac{(T_4(n) + T_1(n)) - (T_3(n) + T_2(n))}{2} \quad \text{(Eq. 6)}$$

where $T_4(n)$ and $T_1(n)$ are the time-of-arrival and time-of-departure time-stamps struck at the master and $T_2(n)$ and $T_3(n)$ are the time-of-arrival and time-of-departure time-stamps struck at the slave. The index (n) represents the notion of the ofm being calculated using the $n^{th}$ packet exchange. It is further noted that the offset from master is an indication of the packet delay variation and error for a packet timing system.

Figure 9A:
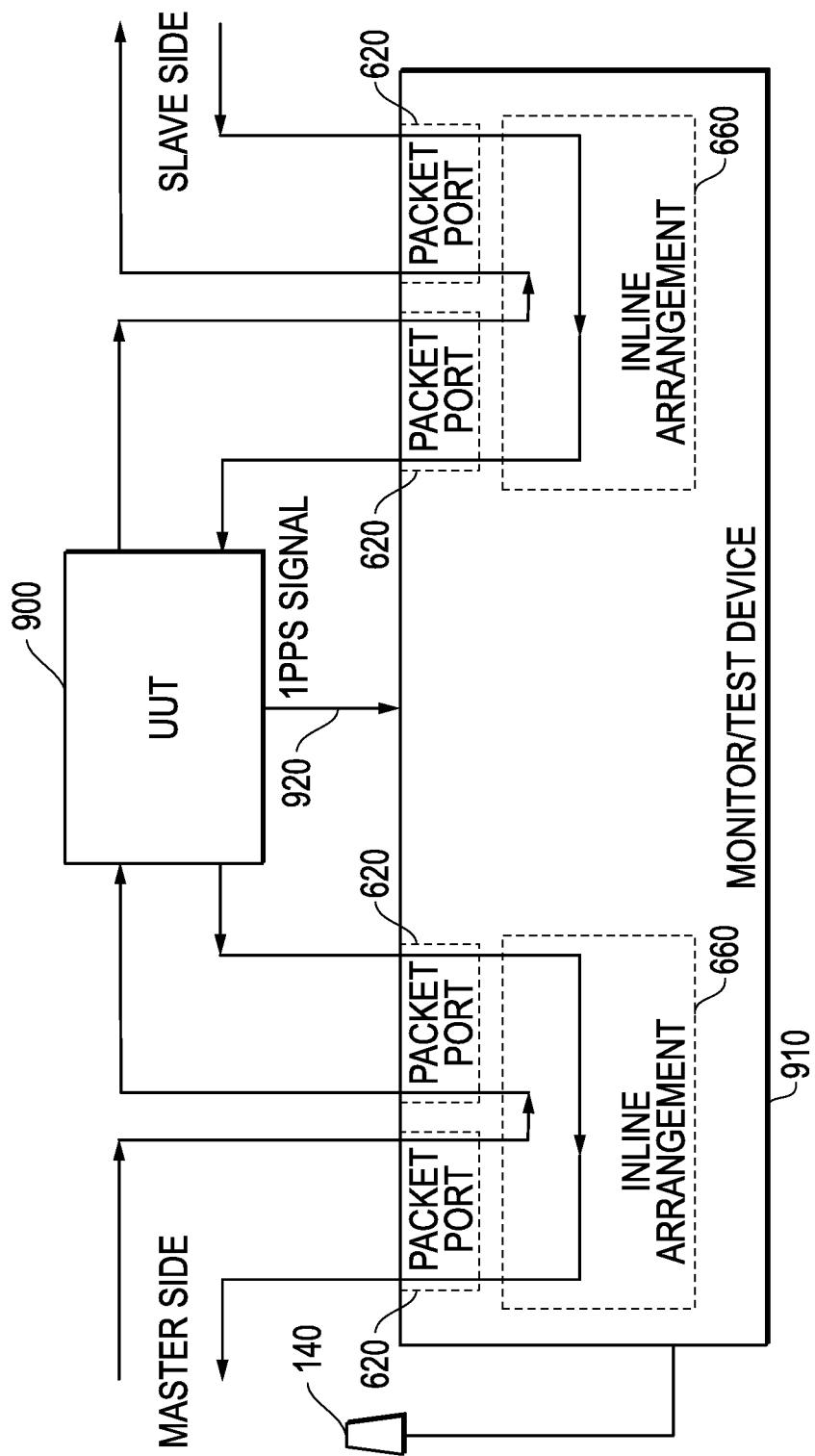
FIGS. 9A and 9B are block diagrams for monitor/test devices including multiple monitor devices in an inline arrangement or in a tap arrangement.
Figure 9B:
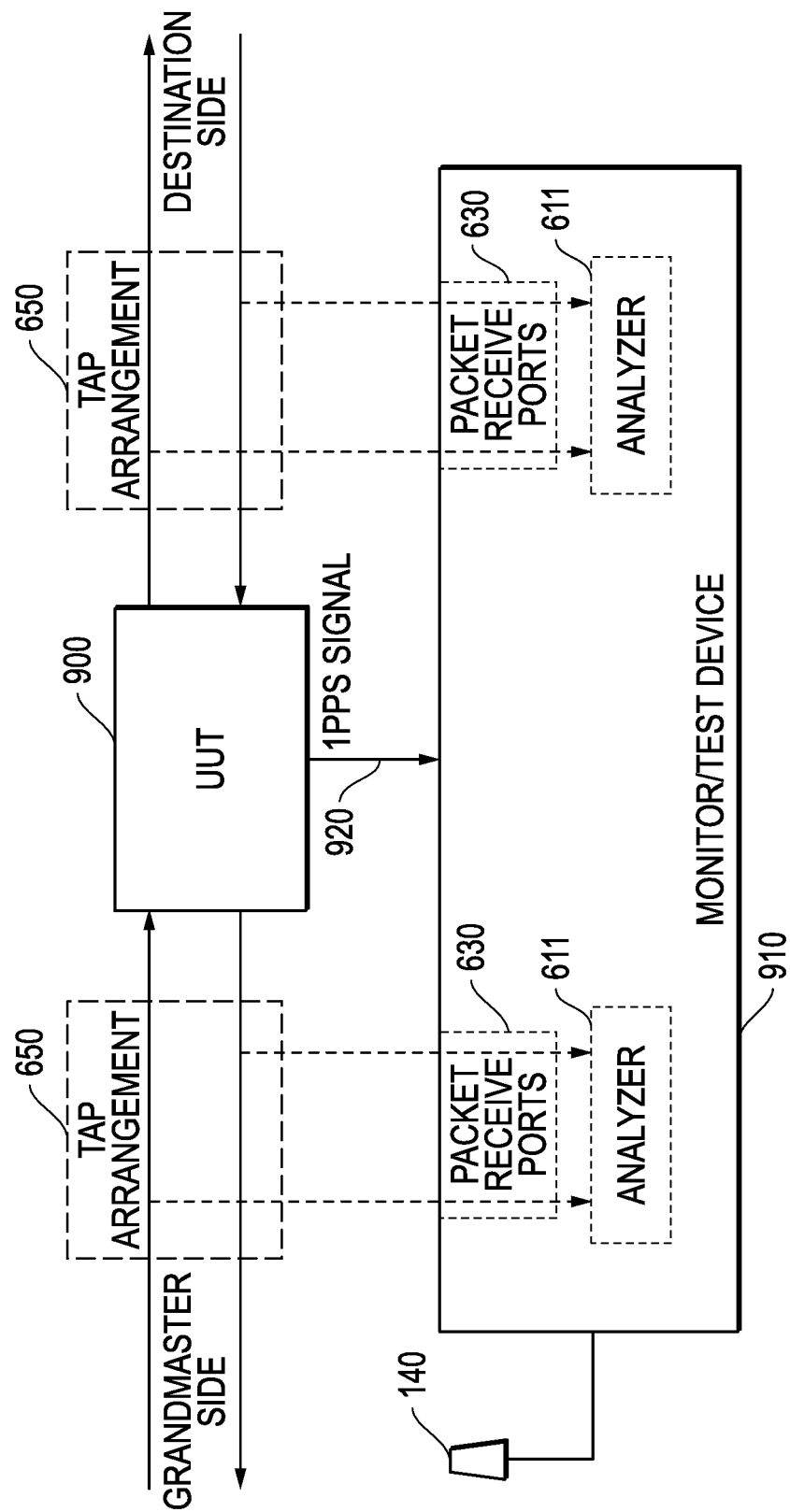

It is important to recognize that both devices, the BC and the monitor, use exactly the same set of packets. Assuming the cables between the monitor and the BC are well calibrated, both the BC and the monitor experience the same asymmetry impairment related to the cable (between the monitor and the master). Denote the ofm for the monitor and BC by $\epsilon^{(MON)}$ and $\epsilon^{(BC)}$, respectively. It is noted that these two should be equal (except for possibly a difference arising from asymmetry in the cable between the monitor and the BC) if the slave side of the BC is functioning correctly. It is also noted that the monitor does not have knowledge of $\epsilon^{(BC)}$ and must estimate that quantity indirectly. This can be measured if the BC provides an auxiliary timing output such as a 1 pps signal 920 as shown in FIGS. 9A and 9B.

By monitoring the packet exchange between the BC master side and a downstream slave, the technique described above can be used to establish $e^{(MON)}$ which is the time-offset-from master of the test equipment relative to the master side of the BC. The effective time offset, $TE_{BC}$, introduced by the BC, which should be zero, is estimated as $$TE_{BC} = \epsilon^{(MON)} - e^{(MON)} \quad \text{(Eq. 7)}$$

That is, the effective time error ($TE_{BC}$) that the BC under test introduces in the chain, of which it is a part of, is estimated as the difference between the time provided to its slave side from the GM side and the time its slave side provides downstream. The impairment includes a wide variety of components including:

PHY asymmetries. These refer to delay asymmetry in its PHY circuitry including the master port and slave port.

Intra-device delay. This represents the internal error within the BC. The BC needs to transfer the correct time from the slave side to the master side and in some cases this may be impaired for some reason.

Internal clock drift. The BC slave clock may drift between time updates.

Time-stamping granularity. It is known that the time-stamping process could be impaired by the "beating effect" and introduce a "static" (or nearly so) error that could be as much as the granularity of its time-stamping mechanism.

Filtered PDV. In some cases there may be some mechanisms that introduce packet delay variation or similar impairment between the master and the slave side of the BC. The PLL function in the slave clock will reduce this somewhat based on filtering and/or proprietary algorithms.

An often necessary, but not sufficient, condition for the BC to be considered satisfactory is the following condition:

$$|TE_{BC}| \leq T_{LIM} \quad \text{(Eq. 8)}$$

where $T_{LIM}$ is the maximum allowable transmission-related error that is introduced by the BC. The above assumes that the cables have been suitably calibrated to remove any contribution associated with asymmetry in propagation delay in the cables.

The stability of the BC clock (essentially the slave clock) can be analyzed by computing the traditional analytics, TDEV (time deviation) and MTIE (maximum time interval error), on the time-error sequence {x(k)} established by comparing the 1 pps output (BC auxiliary test point) with a reference 1 pps. If such 1 pps output is not available, the stability of the BC clock can alternatively be analyzed by computing MTIE and TDEV on the time-error sequence established by measuring the timing packets generated by the boundary clock's master port. It should be noted that in this situation, what is measured is the sum of several error sources. As with measuring a 1 pps output, it includes the error attributable to the stability of the BC clock. It also includes other error sources (e.g., time stamping granularity, intra device delay and other imperfections related to packet transmission within the boundary clock).

When testing boundary clocks in the manner depicted in FIGS. 9A and 9B, it is not necessary that the test equipment 910 be provided a time reference, such as GPS as depicted. It suffices that the equipment be provided an accurate frequency reference. It is well known that providing a frequency reference is simpler than providing a time reference. In the dual device architecture depicted in FIGS. 6A-D, as described above, a time reference is necessary for accurate results.

Additional description of embodiments for packet timing monitors that provide passive detection and measurement of packet delay variations are further set forth with respect to the following Packet Timing Monitor example.

Packet Timing Monitor Example

One approach to testing devices that provides on-path support can be based on the following fundamental principle: introduction of a fixed, symmetric delay does not affect time-transfer between master and slave packet-based clocks. Consequently, introduction of an in-line device that monitors the packet transmissions in both directions between the master-side and slave-side will not impact the transfer of timing: (a) if the delay is constant then frequency transfer is not affected, and (b) if the delay is symmetric then time transfer is not affected.

It is noted that such a device does not introduce new packets and does not alter the packets being communicated between the communicating clocks. Consequently, it does not introduce any additional load on the network. Furthermore, the subsequent analysis is based on packets that the actual deployed clocks utilize for timing transfer. Consequently the monitor device differs from a prior PTP probe in the following ways:

a. Does not generate packets and therefore does not alter network loading. A PTP probe actively performs packet generation as would a PTP slave clock.
b. Can monitor packets between communicating clocks in operation. A PTP probe serves to monitor the network—the impact of the network on an actual slave clock is inferred.
c. A monitor device can perform a protocol analyzer function by examining the packets being exchanged between the actual clocks deployed in the network.

Figure 10A:
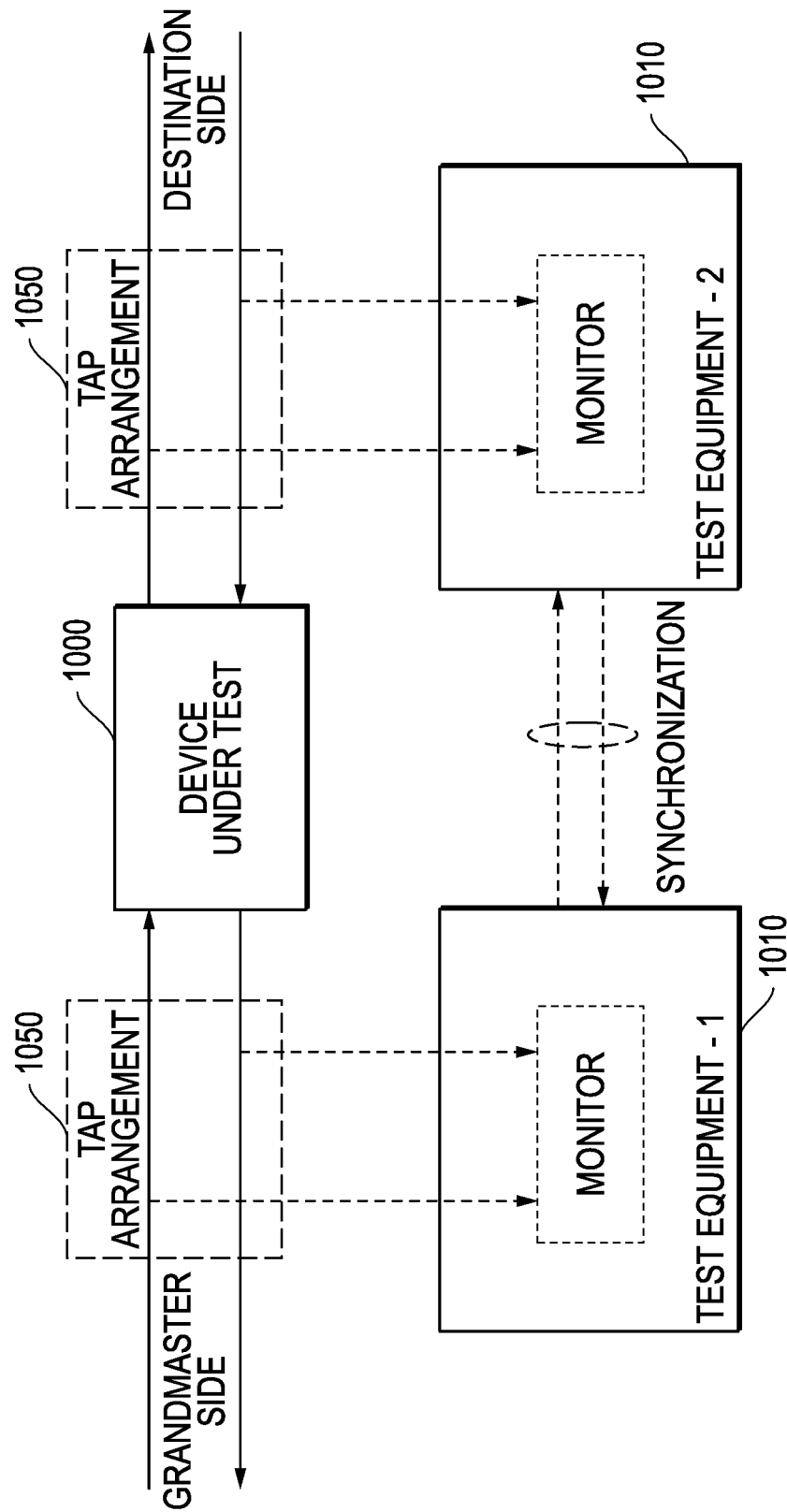
FIGS. 10A and 10B are further block diagrams of example embodiments for monitor devices in an inline arrangement or in a tap arrangement.

There are two primary schema for applying a monitor device. One is a "tapped" mode wherein the test device 1010 monitors the signals between the deployed clocks with respect to a device under test 1000 using a tap or equivalent function 1050 as depicted in FIG. 10A (tapped monitor configuration for testing packet-based clocks). The other is an in-line mode wherein the test device 1010 intercepts and relays packets between the deployed clocks with respect to a device under test 1000, ensuring that the delay introduced is fixed (constant) and symmetric (equal in the two directions of transmission) as depicted in FIG. 10B (in-line monitor configuration for testing packet-based clocks).

In one possible configuration, particularly applicable when the transmission is fiber based, is the use of passive optical splitters that have been suitably calibrated to introduce the same delay in both directions. This configuration is a bridging scheme, and the intent is not to impact the transmission of packets between the communicating clocks in any way. This is depicted in FIG. 10A.

Figure 10B:
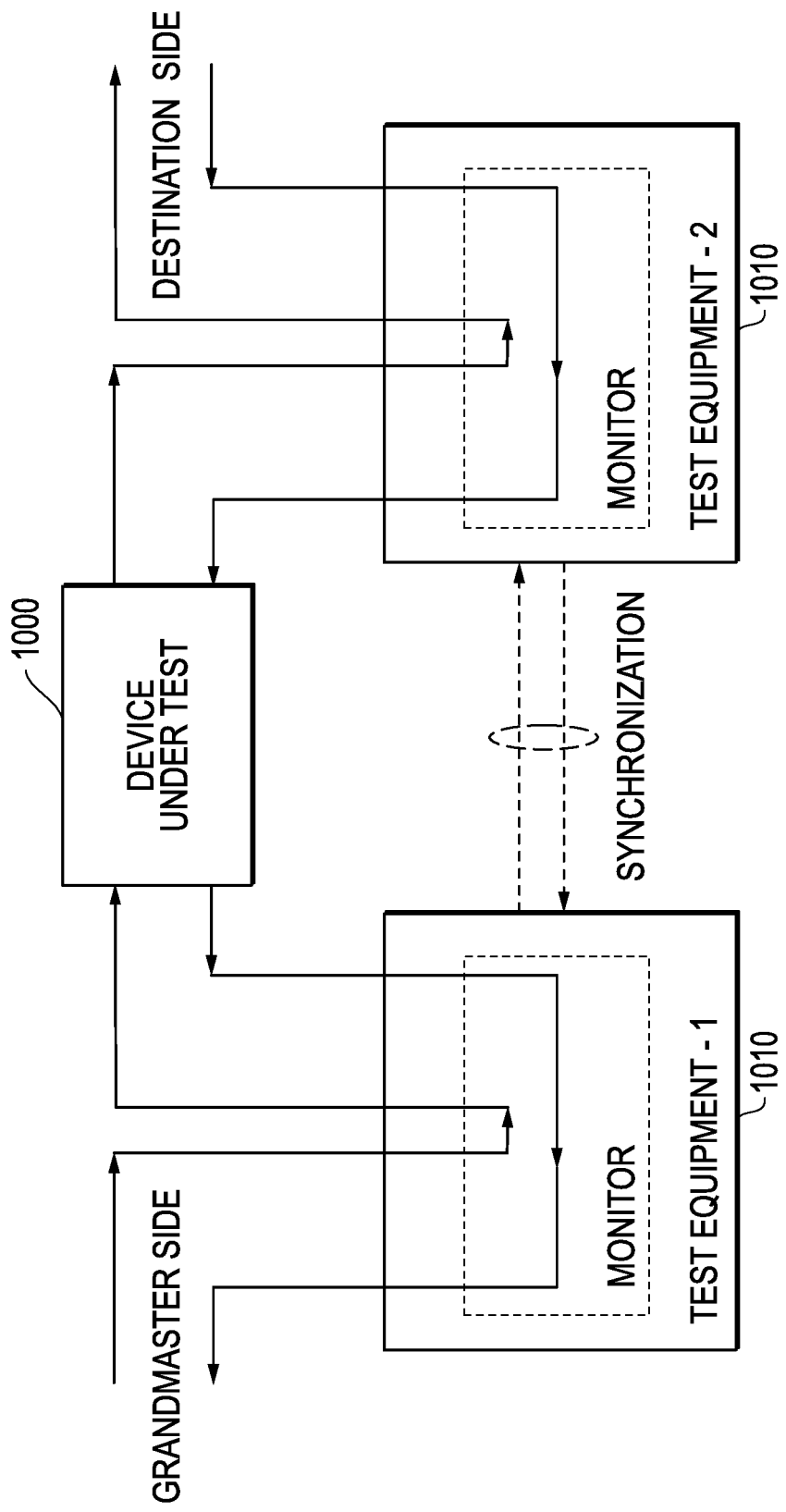

In a second possible configuration, the monitor could take the form as shown in FIG. 10B. In these configurations the test-probe is in-line and does affect the transmission of packets between the communicating clocks but does not impact the ability of the communicating clocks to transfer timing.

It is noted that, from the viewpoint of timing, the two devices 1010 that are monitoring the packet flow must be tightly synchronized. Not shown in FIGS. 10A and 10B is the notion that the monitor device (the test equipment) must be able to synchronize to the same, or equivalent, source as the grand master (frequency and phase and possibly time). This ensures that the monitor device has a stable, accurate, clock and that timing measurements are not colored by frequency offsets resulting from diverse frequency references.

By monitoring the two streams, the test equipment can establish whether the effective delay through the device under test is symmetric and constant. If so, then the device is suitable for on-path support of frequency transfer between the upstream side and downstream side. Implicit in the measurement is that the Grandmaster side ("master") clock provides "clean" time-stamps. If the UUT is a boundary clock and the master side clock is introducing clock noise, then the filtering action of the boundary clock may provide some filtering that reduces the noise towards the destination slave clock but in so doing may appear to be "adding noise" (which can be viewed as the opposite of that introduced by the master).

The testing device performs inspection of the packets to extract the time-stamps being exchanged by the packet-based timing devices. Furthermore, the testing device strikes time-stamps for ingress and egress of packets as they flow through the testing device in both directions. The time-stamping clock in the testing device must be stable. The accuracy of the clock must be commensurate with the allowed tolerance on the overall measurement and preferably traceable to a PRC (primary reference clock) or PRC equivalent (e.g., GPS). Furthermore, the time-stamping granularity noise introduced in the testing device must be small compared to the expected measurement tolerance.

Such a device can be referred to as a packet-based timing monitor. The testing device is passive. In other words, it does not generate packets independently and it does not terminate timing flows. It is therefore distinct and different from a prior PTP non-passive probe device that sends out its own packets.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for direct passive monitoring of network packet timing, comprising:
   passively receiving timing packets exchanged by a first source and a second source, the timing packets being associated with a packet flow between the first source and a second source;
   determining a transit time from the first source to a first monitoring device and a transit time from the first monitoring source to the first source by analyzing timing information within the timing packets; and
   generating time error information associated with the packet flow between the first source and the second source based upon the determined transit times;
   wherein the passively receiving, determining, and generating steps are performed by the first monitoring device, the first monitoring device being coupled to the packet flow between the first source and the second source within a network; and
   further comprising additional steps of:
      passively receiving timing packets exchanged between the second source and a third source, the timing packets being associated with a packet flow between the second source and a third source;
      determining a transit time from the second source to a second monitoring device and a transit time from the second monitoring source to the second source by analyzing timing information within the timing packets; and
      generating time error information associated with the packet flow between the second source and the third source based upon the determined transit times;
      wherein the additional passively receiving, determining, and generating steps are performed by the second monitoring device, the second monitoring device being coupled to the packet flow between the second source and the third source; and
   determining performance information associated with the second source based upon the time error information determined for the packet flow between the first source and the second source by the first monitoring device and based upon the time error information determined for the packet flow between the second source and the third source by the second monitoring device.

2. The method of claim 1, wherein the time error information comprises packet delay variation.

3. The method of claim 1, wherein the first source comprises a master device having a master clock, wherein the third source comprises a slave device having a slave clock, and wherein the second source comprises an intervening sub-network between the master clock device and the slave clock device.

4. The method of claim 1, wherein the first source comprises a master device having a master clock, wherein the third source comprises a slave device having a slave clock, and wherein the second source comprises an intervening unit under test (UUT) between the master clock device and the slave clock device.

5. The method of claim 1, wherein the first source comprises a master device having a master clock, wherein the third source comprises a slave device having a slave clock, and wherein the second source comprises an intervening device having at least one of a boundary clock or transparent clock.

6. The method of claim 1, wherein the passively receiving step for the first monitoring device is conducted with the first monitoring device configured in at least one of an inline arrangement or a tap arrangement with respect to the packet flow between the first source and the second source, and wherein the passively receiving step for the second monitoring device is conducted with the second monitoring device configured in at least one of an inline arrangement or a tap arrangement with respect to the packet flow between the second source and the third source.

7. The method of claim 1, wherein the first monitoring device and the second monitoring device are within a single test instrument.

8. The method of claim 1, wherein a plurality of first and second monitoring devices perform the passively receiving, determining, and generating steps.

9. The method of claim 8, wherein the passively receiving step for each of the plurality of first and second monitoring devices is conducted with the monitoring device configured in at least one of an inline arrangement or a tap arrangement with respect to a packet flow.

10. The method of claim 8, further comprising providing time error information for the plurality of packet flows within the network from the plurality of first and second monitoring devices to a network management system.

11. A system for direct passive monitoring of network packet timing, comprising:
a first monitoring device configured to passively receive timing packets exchanged by a first source and a second source, the timing packets being associated with a packet flow between the first source and the second source;
wherein the first monitoring device is further configured to generate time error information associated with the packet flow between the first source and the second source within a network by analyzing timing information within the timing packets to determine a transit time from the first source to the first monitoring device and a transit time from the first monitoring device to the first source;
a second monitoring device configured to passively receive timing packets exchanged by a second source and a third source, the timing packets being associated with a packet flow between the second source and the third source;
wherein the second monitoring device is further configured to generate time error information associated with the packet flow between the second source and the third source by analyzing timing information within the timing packets to determine a transit time from the second source to the second monitoring device and a transit time from the second monitoring device to the second source; and
wherein performance information is determined for the second source based upon time error information determined for the packet flow between the first source and the second source by the first monitoring device and based upon time error information determined for the packet flow between the second source and the third source by the second monitoring device.

12. The method of claim 11, wherein the time error information comprises packet delay variation.

13. The system of claim 11, wherein the first source comprises a master device having a master clock, wherein the third source comprises a slave device having a slave clock, and wherein the second source comprises an intervening sub-network between the master clock device and the slave clock device.

14. The system of claim 11, wherein the first source comprises a master device having a master clock, wherein the third source comprises a slave device having a slave clock, and wherein the second source comprises an intervening unit under test (UUT) between the master clock device and the slave clock device.

15. The system of claim 11, wherein the first source comprises a master device having a master clock, wherein the third source comprises a slave device having a slave clock, and wherein the second source comprises an intervening device having at least one of a boundary clock or transparent clock.

16. The system of claim 11, wherein the first monitoring device is configured in at least one of an inline arrangement or a tap arrangement with respect to the packet flow between the first source and the second source, and wherein the second monitoring device is configured in at least one of an inline arrangement or a tap arrangement with respect to the packet flow between the second source and the third source.

17. The system of claim 11, wherein the first monitoring device and the second monitoring device are within a single test instrument.

18. The system of claim 11, wherein the system comprises a plurality of first and second monitoring devices.

19. The system of claim 18, wherein each of the plurality of first and second monitoring devices is configured in at least one of an inline arrangement or a tap arrangement with respect to a packet flow.

20. The system of claim 18, wherein the plurality of first and second monitoring devices are configured to provide time error information for the plurality of packet flows within the network to a network management system.

* * * * *